Patented Jan. 14, 1941

2,228,491

UNITED STATES PATENT OFFICE 2,228,491

DIHYDROTACHYSTEROL

Fritz von Werder, Darmstadt, Germany, assignor to Winthrop Chemical Company, Inc., New York, N. Y., a corporation of New York No Drawing. Application February 18, 1939, Serial No. 257,131. In Germany February 23, 1938

11 Claims. (Cl. 260—397)

This invention relates to the manufacture of hydrogenated tachysterol and to certain products obtainable by such manufacture.

Windaus, the applicant and Luettringhaus (Annalen der Chemie, vol. 499, page 198) obtained when subjecting tachysterol to reduction by means of sodium and propylalcohol a mixture which, without being antirachitically active, produces the typical poisonous effect of large vitamin D doses with the mouse.

According to the process of U. S. patent specification 2,070,117 products are obtainable possessing constant properties by subjecting the crystallized tachysterol-3,5-dinitro-4-methyl-1-benzoate to a reducing saponification. In the course of this procedure the stage of tachysterol is avoided which is highly sensitive to air. The product thus obtained is characterized by a specific rotation in alcohol of +20° as well as by an ultraviolet absorption spectrum, showing besides a main maximum at 250 m$\mu$ further maxima at 242 and 261 m$\mu$.

In the course of his further investigation of the hydrogenation products of the tachysterol applicant could prove ("Ueber Sterine, Gallensäuren und verwandte Naturstoffe" by Hans Lettré and H. H. Inhoffen, page 299; see also "Zeitschrift für physiologische Chemie," vol. 233 (1935), page 224) that the tachysterol, subjected to reduction by means of sodium and alcohol, is consisting to about 20–30% of the so-called dihydrovitamin I. Dihydrovitamin I does not show any absorption in the ultraviolet light above 240 m$\mu$ and does not influence in any way the level of the serum calcium. This dihydrovitamin I may also be obtained from products to be manufactured according to U. S. patent specification 2,070,117. This proves that the hydrogenated tachysterol obtainable according to Windaus and his co-workers as well as that obtainable according to U. S. patent specification 2,070,117 must be un-uniform.

The present invention relates to a process by which it has become possible for the first time to isolate the pure crystalline active product from the mixture of the crude hydrogenation products of the tachysterol.

One may start from a hydrogenated tachysterol obtainable according to Windaus, the applicant and Luettringhaus or according to U. S. patent specification 2,070,117 respectively, or from an ergosterol irradiation product, rich in tachysterol (for instance ergosterol rearranged to 80% by irradiation in benzene solution with magnesium spark light) which irradiation product has been reduced as such with sodium and alcohol.

The process of the invention consists in purifying the crude hydrogenation products of the tachysterol or the crude hydrogenation products of mixtures containing tachysterol by means of their esters with low aliphatic fatty acids and in separating in the course of this purification process (prior or after esterification or saponification) impurities by means of the chromatographic method, whereby in every case the constituents with a low adsorption tendency are gathered.

The success of these two stages of the process according to the present invention is somewhat surprising for the expert:

In the chemistry of the irradiation products of the ergosterol (to which the tachysterol belongs) often the problem has emerged how to purify substance mixtures by means of their esters. The esters of lower fatty acids in general used for this purpose did not prove suitable; for this particular field dinitrobenzoic acid ester and allophanic acid ester have rather proved in a certain way as being specifically suitable. When trying to purify the hydrogenation products of tachysterol these esters, however, fail to work. No characteristic derivative is obtained with 3,5-dinitrobenzoic acid, and when manufacturing the allophanic acid ester only the allophanic acid ester of the dihydrovitamin I is obtained. The active product remains in a mixture together with other impurities, from which it could not be caused to crystallize. It is surprising that well crystallized esters are obtained when esterifying the hydrogenation products of tachysterol—at least from a certain degree of purity—with lower fatty acids, that is with acylating agents which have proved unsuitable with similar compounds.

When using the chromatographic adsorption there generally was made the observation that a compound absorbing the light is more retained by the adsorption agent than a transparent compound; whereas the hydrogenation products of the tachysterol show quite the contrary as by no means could be foreseen: The active substance obtainable according to the invention with strong ultraviolet absorption is found in the fractions with a low adsorption tendency, while the impurities of the active product not showing any absorption in the normally investigated ultraviolet region up to 220 m$\mu$ are strongly retained by the adsorption agents as for instance aluminiumoxide.

The best method of carrying out the said invention consists in first of all chromatographing the crude product and then further purifying the product obtained upon esterification. The contents of the single fractions of the desired active product obtained according to this process are advantageously destined by measuring the optical rotation or the ultraviolet absorption. The active substance turns the polarized light strongly to the right and possesses in the ultraviolet light a strong absorption band at 251 m$\mu$ with bybands at 242 and 261 m$\mu$.

The oxides of aluminium and some metals of the alkaline earth metal group have proved as being good adsorption agents. The starting-material is dissolved for instance in a hydrocarbon (benzines with a boiling point between 50 and 80° C. are especially recommendable) and this solution is filtered through a column of the adsorption agent (for instance aluminium oxide standardised according to Brockmann: compare Zechmeister-Cholnoky, "Chromatogr. Adsorptionsmethode" 1937, p. 41) which is subdivided several times. Then the whole is washed with the tenfold volume of the pure solvent. The effective principle of the dihydrotachysterol is present in the filtrate and the inferior parts of the column. The single fractions are eluted preferably by mixtures of ether and methanol. The fractions rich in the active product, characterized in their increased ultra-violet absorption or their specific rotation respectively, are combined and eventually can be subjected to a chromatographic subdivision once again. Also in this further adsorption of the concentrated material the effective principle is less adsorbed than its accompanying substances. To obtain crystallized preparations, capable of being isolated, the preparations concentrated to a large extent, are converted into lower fatty acid esters, for instance, by treating them with the acid anhydrides in pyridine solution at room temperature. The crude esters may be equally chromatographed in case a direct crystallisation cannot be attained; in the course of this process impurities are retained by the adsorption-agent, while the purified esters go into the filtrate. Ester-fractions of a certain degree of purity crystallize at about 0° C. after removing the solvent and storing the residue at 0° C. The crystals can be freed from adhering oil by covering them with a solvent, e. g., with low-boiling petroleum ether and further purified by recrystallizing from methanol. The n-butyric acid ester of the active principle is precipitated from the solution in methylalcohol saturated while hot in colorless needles melting at 62–63° C. The values of the extinction coefficient $$E_{1cm.}^{1\%}.$$

amount for the wave length $\lambda 242$ m$\mu$=720, $\lambda 251$ m$\mu$=840, $\lambda 261$ m$\mu$=540.

The n-propionic acid ester crystallizes from methanol in colorless felted needles, melting at 97–98° C., according to analysis it has the formula $C_{31}H_{50}O_2$. The specific rotation in chloroform amounts to +37°, when testing a 2% solution of the substance dried in high vacuo during 2 hours at 56° C. The absorption spectrum of the propionate in the ultra-violet light is characterized by three maxima at 242 m$\mu$, 251 m$\mu$ and 261 m$\mu$. The values of the extinction coefficient $$E_{1cm.}^{1\%}.$$

amount for the wave length $\lambda 242$ m$\mu$=750, $\lambda 251$ m$\mu$=860, $\lambda 261$ m$\mu$=570.

The acetyl derivative, obtained from methanol in colorless solid crystals, melts at 108–110° C. According to analysis it has the formula $C_{30}H_{48}O_2$. The specific rotation in chloroform amounts to +32.8° under the conditions mentioned in connection with the propionate. The absorption spectrum shows in the ultra-violet light three maxima at the wave length of 242 m$\mu$, 251 m$\mu$ and 261 m$\mu$. The values of the extinction coefficient $$E_{1cm.}^{1\%}.$$

amount for the wave length $\lambda 242$ m$\mu$=780, $\lambda 251$ m$\mu$=910, $\lambda 261$ m$\mu$=600.

From these esters the pure crystallized active principle is obtained by saponification (for instance with methylalcoholic caustic alkali solution). It is easily soluble in organic solvents; it crystallizes from 90% methanol in colorless needles, melting between 125 and 127° C. The value for $$[\alpha]_D^{20}$$

in chloroform amounts to +97°, in alcohol to +92°. The characteristic color reactions of a 1% chloroform solution are the following:

With antimony trichloride: first of all nothing, then after prolonged standing: a deep raspberry-red color.

According to Liebermann-Burchard: rust-brown, quickly changing into green.

According to Salkowski: acid layer blood-red. The substance is carrier of the characteristic ultra-violet absorption of the crude dihydrotachysterol preparations. The values of the extinction coefficient $$E_{1cm.}^{1\%}.$$

amount for the wave length $\lambda 242$ m$\mu$=870, $\lambda 251$ m$\mu$=1010, $\lambda 261$ m$\mu$=650. According to analysis the product probably corresponds to the formula $C_{28}H_{46}O$.

The substance has a greater effect on the level of the serum calcium than could be observed hitherto with the irradiation products of ergosterol and their derivatives. The toxic dosis ascertained with the mouse is about 10$\gamma$. The antirachitic efficiency is slight, a daily dose of 5$\gamma$ has proved efficacious in the prophylactic test with the rat.

*Example 1*

A solution of 127 grs. of hydrogenated tachysterol (manufactured according to Liebigs Ann. 499, page 198 or according to German patent specification 624,231) in 1270 ccms. ordinary benzine are filtered through a column composed of 5 equal parts of 430 grs. of aluminium oxide each (standardized according to Brockmann), having a length of 91 cms. on the whole and a diameter of 56 mms., and which has been moistened before with 1750 ccms. of ordinary benzine. One works suitably under slightly diminished pressure. The aluminium oxide column is washed afterwards with 13 liters of ordinary benzine. The fractions of the column are numbered from above to below 1–5, they are eluted separately with a mixture of equal parts by volume of ether and methanol. Fraction 6 is the filtrate containing the substance nonadsorbed by the column. The fractionation is to be seen from the following table:

Fraction (1) --- 18.60 grs. $[\alpha]_D$ in ether=+ 9.3°
Fraction (2) --- 21.60 grs. $[\alpha]_D$ in ether=+ 7.9°
Fraction (3) --- 22.55 grs. $[\alpha]_D$ in ether=+ 7.4°
Fraction (4) --- 24.00 grs. $[\alpha]_D$ in ether=+13.7°
Fraction (5) --- 23.21 grs. $[\alpha]_D$ in ether=+29.9°
Fraction (6) --- 15.59 grs. $[\alpha]_D$ in ether=+55.7°

The active principle is to be found to a prevailing extent in the Fractions (5) and (6), the specific rotation of which is especially high.

The material of the Fraction (5) is dissolved in 232 ccms. of ordinary benzine, and the solution filtered through a column with a length of 33 cms. and a diameter of 40 mms., composed of 5 equal parts of 77 grs. of aluminium oxide each (standardized according to Brockmann) and moistened with 300 ccms. of ordinary benzine. The chromatogram is developed by washing with 3500 ccms. of ordinary benzine. The single fractions are numbered in the same range as indicated above and eluted with a mixture of ether and methanol:

Fraction (1) _____ 3.25 grs. $[\alpha]_D$ in ether$=+20.9°$
Fraction (2) _____ 3.75 grs. $[\alpha]_D$ in ether$=+20.5°$
Fraction (3) _____ 4.10 grs. $[\alpha]_D$ in ether$=+21.0°$
Fraction (4) _____ 4.30 grs. $[\alpha]_D$ in ether$=+22.3°$
Fraction (5) _____ 4.07 grs. $[\alpha]_D$ in ether$=+41.8°$
Fraction (6) _____ 2.88 grs. $[\alpha]_D$ in ether$=+55.9°$ The Fractions (1), (2), (3) and (4) contain the active principle in the same concentration as the starting-material and are used when starting a new batch.

The Fraction (6) from the first separation, as well as Fractions (5) and (6) from the second separation are united (22.54 grs.), dissolved in 135 ccms. of pyridine and treated with 45 ccms. of acetic anhydride. After a three days' storing at room temperature water is added under cooling, whereupon the acetate precipitates as partly crystallized oil. After some hours 1350 ccms. of 5% hydrochloric acid are poured into the solution under cooling with ice-water. Finally the mixture is extracted with ether. The united ethereal extracts are washed with a 2% caustic soda solution and water, dried, filtered, concentrated and the ether is sucked off under diminished pressure. The residue weighing 24.5 grs. is dissolved in 245 ccms. of ordinary benzine and the solution filtered through a column of 3 times 136 grs. of aluminium oxide (standardized according to Brockmann). The column is washed with 3675 ccms. of ordinary benzine. 20.3 grs. of the starting-material are recovered in Fraction (4) (filtrate) and crystallize after removal of the solvent at a temperature of about 0° C. The separation of crystals is increased by covering with low-boiling petroleum ether while the adherent oil dissolves. The crystals are sucked off, washed with a mixture of equal parts by volume of petroleum ether and methanol and dried. The yield of 8 grs. can be increased by another chromatographic fractionation of the material remained in the mother liquor, whereby the filtrate-fraction crystallizes again. The crude product is purified by recrystallization from methanol. The pure acetate of the active principle precipitates from this solvent in colorless, solid crystals, which melt at 108 to 110° C.; according to analysis the product has the formula $C_{30}H_{48}O_2$. The specific rotation $[\alpha]_D$ is $+32.8°$ in a 2% chloroform solution. The absorption spectrum in the ultraviolet light is described in detail above.

14 grs. of the pure acetate are boiled under reflux with 1400 ccms. of 5% methylalcoholic potassium hydroxide solution during 2 hours. The solution is reduced to half of its volume in vacuo and completely extracted with ether after the addition of 3 liters of water. The united ether-solutions are washed with water, dried, filtered and concentrated. The residue of the solvent is removed in vacuo. The colorless, crystallized residue is recrystallized twice from 90% methanol. 7.7 grs. of the pure active principle are obtained in colorless needles melting at 125–127° C. The pure alcohol has according to analysis the formula $C_{28}H_{46}O$, its specific rotation in chloroform amounts to $+97°$. The values of the extinction-coefficient $$E^{1\%}_{1cm.}$$

are mentioned above. The pure active principle has low antirachitic activity but distinctly elevates the level of the serum calcium. The toxic dosis ascertained with the mouse amounts to about 10λ.

*Example 2*

Ergosterol is irradiated in benzene solution with magnesium spark light until 80% of the ergosterol have been rearranged by the irradiation. The irradiation product freed from ergosterol in the known manner is reduced in the usual way with sodium and alcohol.

153 grs. of this material are dissolved in 1530 ccms. of petroleum ether (boiling from 40–60° C.) and filtered through a column, composed of 5 equal parts of 450 grs. of aluminium oxide each, standardized according to Brockmann which has a diameter of 56 mms. and has been moistened with 1.75 liters of petroleum ether. The chromatogram is developed by washing with 15.3 liters of petroleum ether. The single fractions of the column are eluted with an ether-methanol-mixture, they are numbered (1)–(5) from above to below. The filtrate having passed the column is Fraction (6).

18.9 grs. are obtained from Fraction (1)
22.2 grs. are obtained from Fraction (2)
20.7 grs. are obtained from Fraction (3)
22.2 grs. are obtained from Fraction (4)
22.0 grs. are obtained from Fraction (5)
45.5 grs. are obtained from Fraction (6)

The absorption-spectra of the 0.02% and 0.005% solutions of the single fractions in ether are measured with layers of a thickness of 1 to 12 mms. It results that only the Fraction (6) contains a noteworthy quantity of the substance, typically absorbing in the short-wave ultraviolet light. The middle-fractions (2)–(5) only contain a small quantity of this substance, whilst Fraction (1) is containing a bit more. Fraction (6) is subjected in an analogous manner to a repeated chromatographic fractionation. The absorption-spectra obtained with 0.05% ethereal solutions show that the active principle now is chiefly contained in the Fractions (5) and (6) (designation of the fractions as above).

The material of these two fractions is chromatographically fractionated a third time, and this time the material strongly absorbing in the ultraviolet light is found in the Fractions (4), (5) and (6).

The aforementioned fractions are united (8.2 grs.), dissolved in 50 ccms. of pyridine and treated with 16 ccms. of propionic acid anhydride. After a 3 days' storing at room temperature 500 ccms. of 5% hydrochloric acid are dropped in under stirring and cooling with ice water. After having stirred for several hours at room temperature the mixture is completely extracted with ether, the united ether solutions are freed from acid by treatment with 2% sodium hydroxide solution, washed with water, dried, filtered, concentrated and the ether removed under diminished pressure. The residue weighing 9.2 grs. is dissolved in 92 ccms. of ordinary benzine and filtered through a column of three parts of 51 grs. of magnesium oxide each. The column is washed with 1840 ccms. of ordinary benzine. The main part of the material (5.75 grs.) is found in Fraction (4) (filtrate), which starts crystallizing after removal of the solvent and a prolonged storing at about 0° C. The material is covered with low boiling petroleum ether. After 24 hours' storage at room temperature the crystals are sucked off, washed with a mixture of equal parts by weight of petroleum ether and methanol and dried. The yield amounts to 1 g. The ester is purified by recrystallization from methanol. The pure propionate crystallizes from methanol in colorless felted needles, melting at 97 to 98° C. According to analysis the product has the formula $C_{31}H_{50}O_2$. The specific rotation in chloroform is $+37°$ and the absorption spectrum in the ultraviolet light is characterized above.

The pure propionic acid ester is saponified in the same way as indicated in Example 1 for the acetate by boiling with methylalcoholic potassium hydroxide solution and the reaction product is recrystallized from 90% methanol; the pure active product obtained has the same properties as the product described in Example 1.

I claim:

1. The process of isolating chemically uniform crystalline dihydro-tachysterol which comprises converting the crude hydrogenation product of tachysterol into its ester with a low fatty acid, purifying the ester by recrystallization and finally saponifying the ester, a purification by chromatographic adsorption being introduced at any stage of the process whereby the components having a minor tendency of being adsorbed and containing the active principle are collected for further working up.

2. The process of isolating chemically uniform crystalline dihydro-tachysterol which comprises subjecting the solution of the crude hydrogenation product of tachysterol in an inert organic solvent of chromatographic adsorption while collecting the components having a minor tendency of being adsorbed, converting the said components containing the hydrogenation product of tachysterol into its ester with a low fatty acid, purifying the ester by recrystallization and finally saponifying the ester.

3. The process of isolating chemically uniform crystalline dihydro-tachysterol which comprises subjecting the solution of the crude hydrogenation product of tachysterol in an inert organic solvent to chromatographic adsorption by means of active aluminium oxide while collecting the components having a minor tendency of being adsorbed, converting the said components containing the hydrogenation product of tachysterol into its ester with a low fatty acid, purifying the ester by recrystallization and finally saponifying the ester.

4. The process of isolating chemically uniform crystalline dihydro-tachysterol which comprises subjecting the solution of the crude hydrogenation product of tachysterol in an inert organic solvent to chromatographic adsorption by means of active aluminium oxide while collecting the components having a minor tendency of being adsorbed, converting the said components containing the hydrogenation product of tachysterol into its ester with a low fatty acid, subjecting the solution of the ester obtained in an inert organic solvent to chromatographic adsorption while collecting the components having a minor tendency of being adsorbed, recrystallizing the said components and saponifying the crystalline ester.

5. The process of isolating chemically uniform crystalline dihydro-tachysterol which comprises subjecting the solution of the crude hydrogenation product of tachysterol in benzine to chromatographic adsorption by means of active aluminium oxide while collecting the components having a minor tendency of being adsorbed, converting the said components containing the hydrogenation product of tachysterol into its ester with a low fatty acid, purifying the ester by crystallization and finally saponifying the ester.

6. The process of isolating chemically uniform crystalline dihydro-tachysterol which comprises subjecting the solution of the crude hydrogenation product of tachysterol in benzine to chromatographic adsorption by means of active aluminium oxide while collecting the components having a minor tendency of being adsorbed, subjecting the said components to a repeated chromatographic adsorption and converting the components having a minor tendency of being adsorbed into its ester by treatment with the anhydride of a lower fatty acid in pyridine solution, isolating the ester formed from the reaction mixture, subjecting its solution in benzine to chromatographic adsorption while collecting the components having a minor tendency of being adsorbed, recrystallizing these components, saponifying the crystalline ester and recrystallizing the dihydro-tachysterol obtained.

7. The process of isolating chemically uniform crystalline dihydro-tachysterol which comprises subjecting the solution of the crude hydrogenation product of tachysterol in benzine to chromatographic adsorption by means of active aluminium oxide while collecting the components having a minor tendency of being adsorbed, subjecting the said components to a repeated chromatographic adsorption and converting the components having a minor tendency of being adsorbed into its ester by treatment with acetic anhydride in pyridine solution, isolating the ester formed from the reaction mixture, subjecting its solution in benzine to chromatographic adsorption while collecting the components having a minor tendency of being adsorbed, recrystallizing these components, saponifying the crystalline ester and recrystallizing the dihydro-tachysterol obtained.

8. A product selected from the group consisting of chemically uniform crystalline dihydrotachysterol, having in alcoholic solution a rotation power $$[\alpha]_D^{20} + 92°$$

and the esters of dihydro-tachysterol with low fatty acids.

9. Chemically uniform crystalline dihydrotachysterol melting at 125–127° C., having in alcoholic solution a rotation power $$[\alpha]_D^{20} + 92°$$

10. An ester of dihydro-tachysterol with a low fatty acid.

11. Dihydro-tachysterol-acetate.

FRITZ VON WERDER.